(12) United States Patent
Kuo

(10) Patent No.: US 12,089,272 B2
(45) Date of Patent: Sep. 10, 2024

(54) METHOD AND APPARATUS FOR A USER EQUIPMENT (UE) TO TRANSMIT A DIRECT COMMUNICATION REQUEST MESSAGE IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/325,668

(22) Filed: May 20, 2021

(65) Prior Publication Data

US 2021/0400746 A1     Dec. 23, 2021

Related U.S. Application Data

(60) Provisional application No. 63/040,968, filed on Jun. 18, 2020.

(51) Int. Cl.
| | | |
|---|---|---|
| *H04W 76/14* | (2018.01) | |
| *H04W 76/11* | (2018.01) | |
| *H04W 80/02* | (2009.01) | |
| *H04W 88/04* | (2009.01) | |
| *H04W 92/18* | (2009.01) | |

(52) U.S. Cl.
CPC ............ *H04W 76/14* (2018.02); *H04W 76/11* (2018.02); *H04W 80/02* (2013.01); *H04W 88/04* (2013.01); *H04W 92/18* (2013.01)

(58) Field of Classification Search
CPC ..... H04W 8/005; H04W 48/16; H04W 76/10; H04W 76/14; H04W 80/02; H04W 88/04; H04W 92/18
USPC ........................................ 370/252, 315, 329
See application file for complete search history.

(56) References Cited

U.S. PATENT DOCUMENTS

2022/0377524 A1\* 11/2022 Ferdi ..................... H04W 8/005

FOREIGN PATENT DOCUMENTS

CN     110602801     12/2019

OTHER PUBLICATIONS

3GPP TR 23.752 V0.3.0, 3rd Generation Partnership Project; Technical Specification Group Services and System Aspects; Study on system enhancement for Proximity based Services (ProSe) in the 5G System (5GS) (Release 17) (Year: 2020).\*
3GPP TS 23.287 V16.2.0, 3rd Generation Partnership Project; Technical Specification Group Services and System Aspects; Architecture enhancements for 5G System (5GS) to support Vehicle-to-Everything (V2X) services (Year: 2020).\*
Notice of Office Action in corresponding KR Application No. 10-2021-0064557, dated Jun. 24, 2022.

(Continued)

*Primary Examiner* — Harun Chowdhury
(74) *Attorney, Agent, or Firm* — Skaar Ulbrich Macari, P.A.

(57) ABSTRACT

A method and device are disclosed from the perspective of a first User Equipment (UE) to perform a PC5 unicast link establishment procedure. In one embodiment, the method includes the first UE transmitting a first PC5-S message for establishing a PC5 unicast link with a UE-to-UE Relay, wherein the PC5-S message includes a Layer-2 Identity (ID) of a second UE. The method further includes the first UE receiving a second PC5-S message from the UE-to-UE Relay, wherein the second PC5-S message is transmitted by the UE-to-UE Relay in response to reception of the first PC5-S message.

20 Claims, 17 Drawing Sheets

(56) References Cited

OTHER PUBLICATIONS

3rd Generation Partnership Project; Technical Specification Group Services and System Aspects; Study on system enhancement for Proximity based Services (ProSe) in the 5G System (5GS) (Release 17), 3GPP TR 23.752 V0.3.0 (Jan. 2020).
CATT "Considerations about ProSe UE-UE Relays", Agenda Item: 7.13, Work Item/Release: eProSe-Ext/Rel-13, S2-142853, SA WG2 Meeting #104, Jul. 7-11, 2014, Dublin, Ireland.
Philips International B.V., "UE-to-Network Relay discovery and handling of PDU session parameters", Agenda Item 8.8, Work Item/Release: FS_5G_ProSe/Rel-17, S2-20XXXX3, Sa WG2 Meeting #139, Elbonia, Jun. 1-12, 2020.
Draft R1-3GPP TS 23.287 V16.2.0 Technical Specification, 3rd Generation Partnership Project; Technical Specification Group Services and System Aspects; Architecture enhancements for 5G System (5GS) to support Vehicle-to-Everything (V2X) services (Release 16).
Office Action from CN in corresponding CN Application No. CN202110550590.5, dated Jun. 24, 2022.
3rd Generation Partnership Project; Technical Specification Group Services and System Aspects; Study on system enhancement for Proximity based Services (ProSe) in the 5G System (5GS) (Release 17), 3GPP TR 23.752 V0.3.0 (Jan. 2020), 650 Route des Lucioles-Sophia Antipolis, Valbonne—France.

\* cited by examiner

Legend:
- PC5-U: The SDAP/PDCP/RLC/MAC/PHY functionality is specified in TS 38.300.
- For PDCP SDU type "Non-IP", a "Non-IP Type" header included in the SDU by upper layer to indicate the type of non-IP messages carried will be specified in stage 3 specification.

Legend:
- PC5-S Protocol: The protocol used for the control plane signalling over the PC5 reference point for the secure layer-2 link as specified in clause 6.3.3.
- The PDCP/RLC/MAC/PHY functionality is specified in TS 38.300.

| Index | LCID values |
|---|---|
| 0 | SCCH carrying PC5-S messages that are not protected |
| 1 | SCCH carrying PC5-S messages "Direct Security Mode Command" and "Direct Security Mode Complete" |
| 2 | SCCH carrying other PC5-S messages that are protected |
| 3 | SCCH carrying PC5-RRC messages |
| 4–19 | Identity of the logical channel |
| 20–61 | Reserved |
| 62 | Sidelink CSI Reporting |
| 63 | Padding |

FIG. 14 (PRIOR ART)

METHOD AND APPARATUS FOR A USER EQUIPMENT (UE) TO TRANSMIT A DIRECT COMMUNICATION REQUEST MESSAGE IN A WIRELESS COMMUNICATION SYSTEM

CROSS-REFERENCE TO RELATED APPLICATIONS

The present application claims the benefit of U.S. Provisional Patent Application Ser. No. 63/040,968 filed on Jun. 18, 2020, the entire disclosure of which is incorporated herein in their entirety by reference.

FIELD

This disclosure generally relates to wireless communication networks, and more particularly, to a method and apparatus for a User Equipment (UE) to transmit a direct communication request message in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first User Equipment (UE) to perform a PC5 unicast link establishment procedure. In one embodiment, the method includes the first UE transmitting a first PC5-S message for establishing a PC5 unicast link with a UE-to-UE Relay, wherein the PC5-S message includes a Layer-2 Identity (ID) of a second UE. The method further includes the first UE receiving a second PC5-S message from the UE-to-UE Relay, wherein the second PC5-S message is transmitted by the UE-to-UE Relay in response to reception of the first PC5-S message.

BRIEF DESCRIPTION OF THE DRAWINGS

FIG. 14 is a reproduction of Table 6.2.4-1 of 3GPP TS 38.321 V16.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V16.2.0, "Architecture enhancements for 5G System (5GS) to support Vehicle-to-Everything (V2X) services (Release 16)"; TS 24.587 V16.0.0, "Vehicle-to-Everything (V2X) services in 5G System (5GS); Stage 3 (Release 16)"; TR 23.752 V0.3.0, "Study on system enhancement for Proximity based services (ProSe) in the 5G System (5GS) (Release 17)"; and TS 38.321 V16.1.0, "NR; Medium Access Control (MAC) protocol specification (Release 16)". The standards and documents listed above are hereby expressly incorporated by reference in their entirety.

Figure 1:
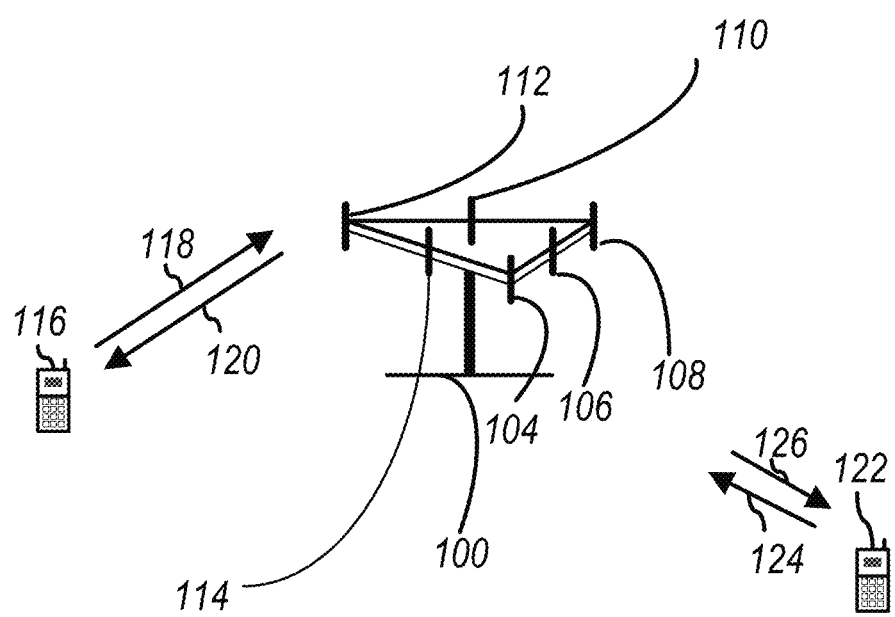
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
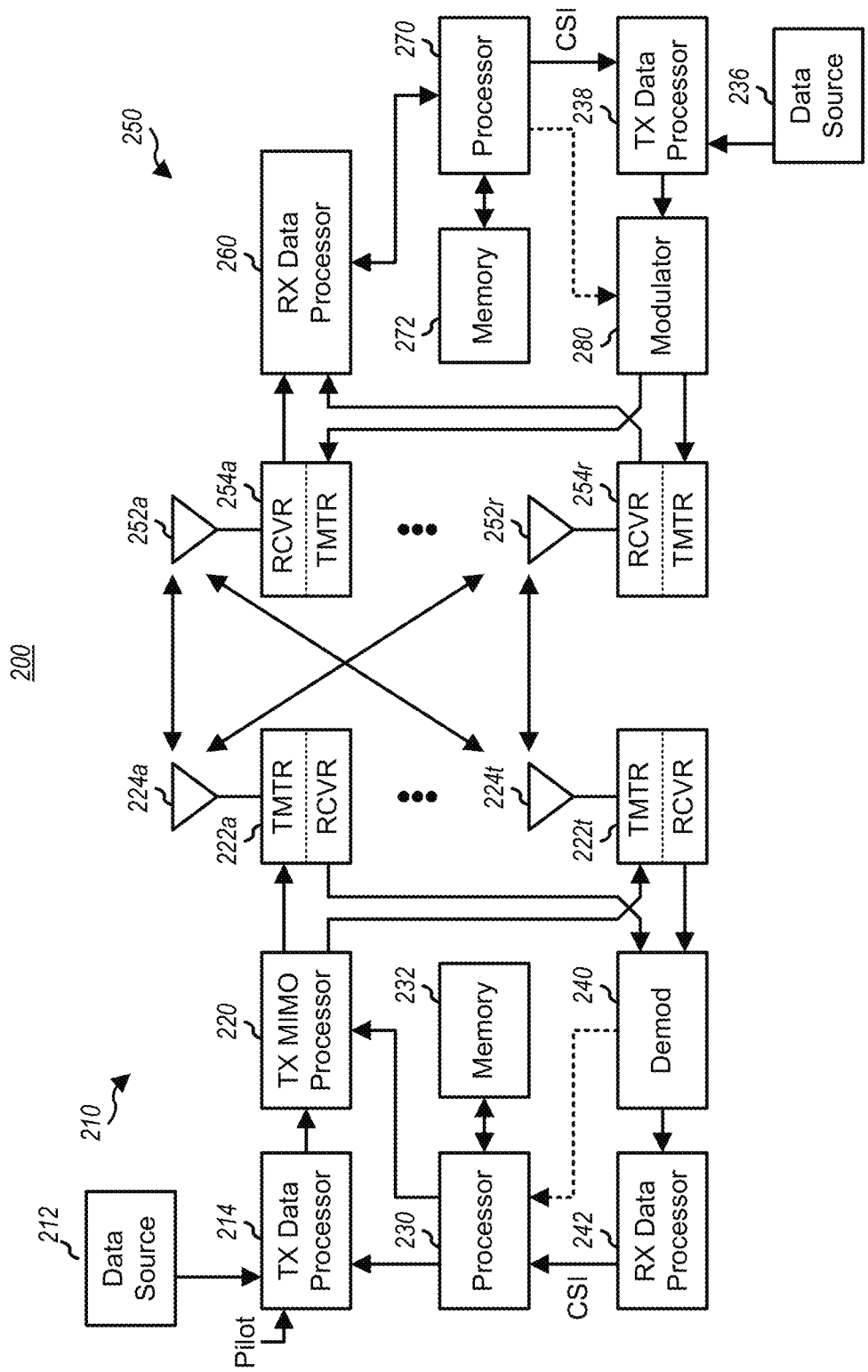
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
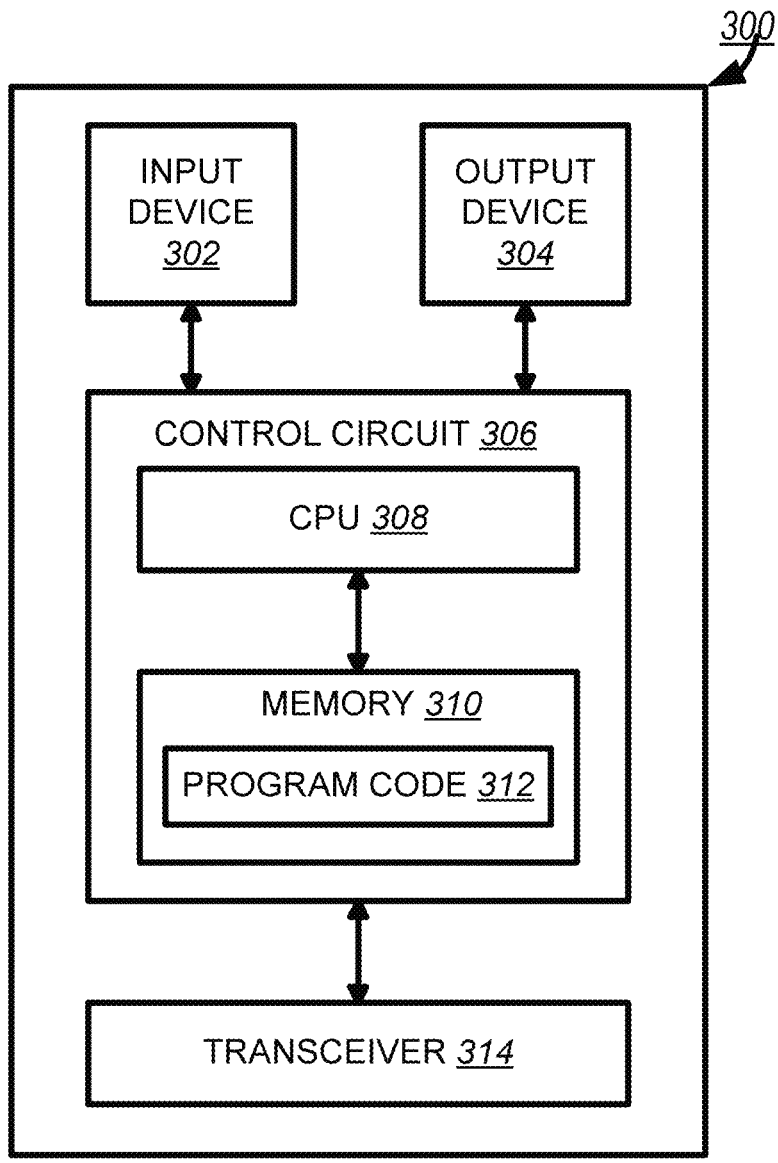
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
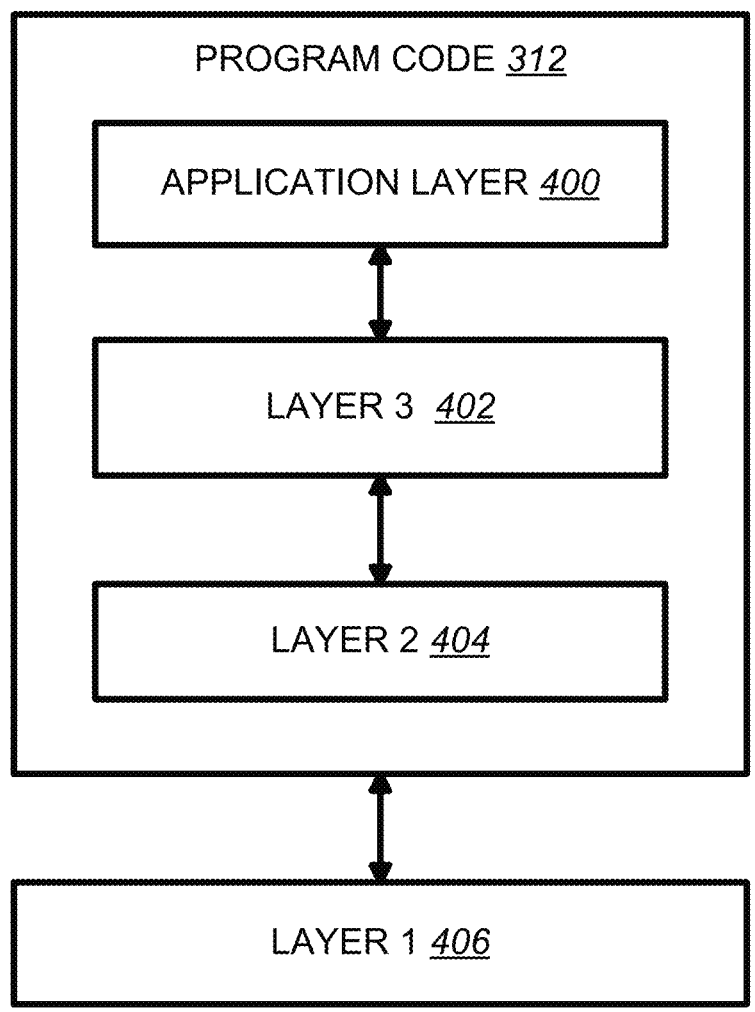
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies procedures related to unicast mode V2X communication over PC5 reference point as follows:

5.1.2 Authorization and Provisioning for V2X Communications Over PC5 Reference Point
5.1.2.1 Policy/Parameter Provisioning
The following sets of information for V2X communications over PC5 reference point is provisioned to the UE:
1) Authorization policy:
   When the UE is "served by E-UTRA" or "served by NR":
      PLMNs in which the UE is authorized to perform V2X communications over PC5 reference point when "served by E-UTRA" or "served by NR".
      For each above PLMN:
         RAT(s) over which the UE is authorized to perform V2X communications over PC5 reference point.
   When the UE is "not served by E-UTRA" and "not served by NR":
      Indicates whether the UE is authorized to perform V2X communications over PC5 reference point when "not served by E-UTRA" and "not served by NR".
      RAT(s) over which the UE is authorized to perform V2X communications over PC5 reference point.
   NOTE 1: In this specification, {When the UE is "served by E-UTRA" or "served by NR"} and {When the UE is "not served by E-UTRA" and "not served by NR"} are relevant to V2X communications over PC5 reference point.
2) Radio parameters when the UE is "not served by E-UTRA" and "not served by NR":
   Includes the radio parameters per PC5 RAT (i.e. LTE PC5, NR PC5) with Geographical Area(s) and an indication of whether they are "operator managed" or "non-operator managed". These radio parameters (e.g., frequency bands) are defined in TS 36.331 [14] and TS 38.331 [15]. The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.
   NOTE 2: Whether a frequency band is "operator managed" or "non-operator managed" in a given Geographical Area is defined by local regulations.
3) Policy/parameters per RAT for PC5 Tx Profile selection:
   The mapping of V2X service types (e.g. PSIDs or ITS-AIDS) to Tx Profiles (see TS 36.300 [9] and TS 38.300 [11] for further information).
4) Policy/parameters related to privacy:
   The list of V2X service types, e.g. PSIDs or ITS-AIDS of the V2X applications, with Geographical Area(s) that require privacy support.
   A privacy timer value indicating the duration after which the UE shall change each source Layer-2 ID self-assigned by the UE when privacy is required.
5) Policy/parameters when LTE PC5 is selected:
   Same as specified in TS 23.285 [8] clause 4.4.1.1.2 item 3) Policy/parameters except for the mapping of V2X service types to Tx Profiles and the list of V2X services with Geographical Area(s) that require privacy support.
6) Policy/parameters when NR PC5 is selected:
   The mapping of V2X service types (e.g. PSIDs or ITS-AIDS) to V2X frequencies with Geographical Area(s).
   The mapping of Destination Layer-2 ID(s) and the V2X service types, e.g. PSIDs or ITS-AIDs of the V2X application for broadcast.
   The mapping of Destination Layer-2 ID(s) and the V2X service types, e.g. PSIDs or ITS-AIDs of the V2X application for groupcast.
   The mapping of default Destination Layer-2 ID(s) for initial signalling to establish unicast connection and the V2X service types, e.g. PSIDs or ITS-AIDS of the V2X application.
   NOTE 3: The same default Destination Layer-2 ID for unicast initial signalling can be mapped to more than one V2X service types. In the case where different V2X services are mapped to distinct default Destination Layer-2 IDs, when the UE intends to establish a single unicast link that can be used for more than one V2X service types, the UE can select any of the default Destination Layer-2 IDs to use for the initial signalling.
   PC5 QoS mapping configuration:
      Input from V2X application layer:
         V2X service type (e.g. PSID or ITS-AID).
         (Optional) V2X Application Requirements for the V2X service type, e.g. priority requirement, reliability requirement, delay requirement, range requirement.
      NOTE 4: Details of V2X Application Requirements for the V2X service type is up to implementation and out of scope of this specification.
      Output:
         PC5 QoS parameters defined in clause 5.4.2 (i.e. PQI and conditionally other parameters such as MFBR/GFBR, etc.).
         AS layer configurations (see TS 38.331 [15]), e.g. the mapping of PC5 QoS profile(s) to radio bearer(s), when the UE is "not served by E-UTRA" and "not served by NR".
         The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.
7) Validity timer indicating the expiration time of the V2X Policy/Parameter.

The above parameter sets from bullet 2) to 6) may be configured in the UE through the V1 reference point by the V2X Application Server.

[ . . . ]

5.2.1.4 Unicast Mode Communication Over PC5 Reference Point

Unicast mode of communication is only supported over NR based PC5 reference point. Graphic 5.2.1.4-1 illustrates an example of PC5 unicast links.

Figure 5:
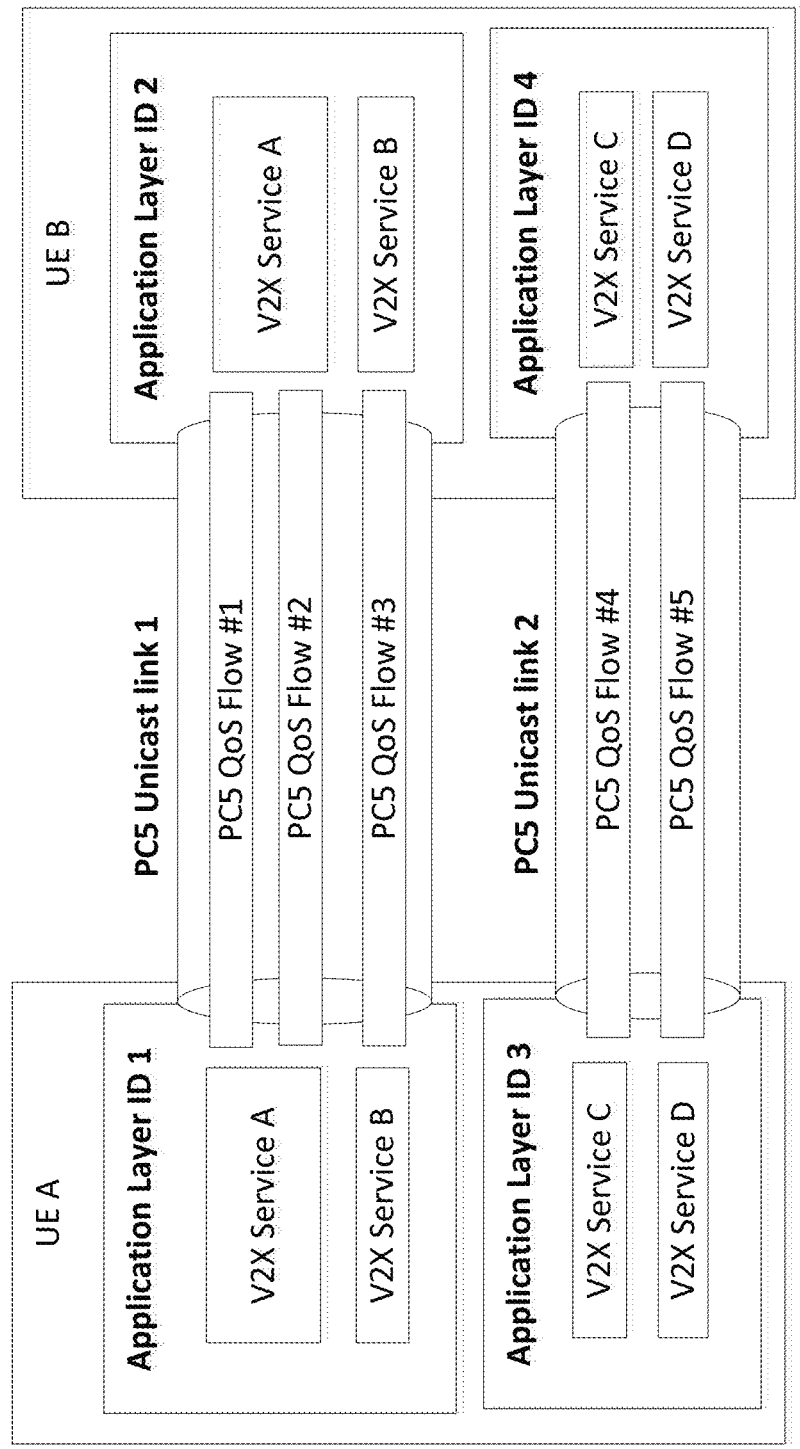
FIG. 5 is a reproduction of Graphic 5.2.1.4-1 of 3GPP TS 23.287 V16.2.0.

[Graphic 5.2.1.4-1 of 3GPP TS 23.287 V16.2.0, entitled "Example of PC5 Unicast Links", is reproduced as FIG. 5]

The following principles apply when the V2X communication is carried over PC5 unicast link:

- A PC5 unicast link between two UEs allows V2X communication between one or more pairs of peer V2X services in these UEs. All V2X services in the UE using the same PC5 unicast link use the same Application Layer ID.
- NOTE 1: An Application Layer ID can change in time as described in clauses 5.6.1.1 and 6.3.3.2, due to privacy. This does not cause a re-establishment of a PC5 unicast link. The UE triggers a Link Identifier Update procedure as specified in clause 6.3.3.2.
- One PC5 unicast link supports one or more V2X service types (e.g. PSIDs or ITS-AIDS) if these V2X service types are at least associated with the pair of peer Application Layer IDs for this PC5 unicast link. For example, as illustrated in Graphic 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
- NOTE 2: A source UE is not required to know whether different target Application Layer IDs over different PC5 unicast links belong to the same target UE.
- A PC5 unicast link supports V2X communication using a single network layer protocol e.g. IP or non-IP.
- A PC5 unicast link supports per-flow QoS model as specified in clause 5.4.1.

When the Application layer in the UE initiates data transfer for a V2X service type which requires unicast mode of communication over PC5 reference point:

- the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise
- the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

- V2X service type(s) (e.g. PSID(s) or ITS-AID(s)); and
- Application Layer ID and Layer-2 ID of UE A; and
- Application Layer ID and Layer-2 ID of UE B; and
- network layer protocol used on the PC5 unicast link; and
- for each V2X service type, a set of PC5 QoS Flow Identifier(s) (PFI(s)). Each PFI is associated with QoS parameters (i.e. PQI).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

V2X Service Info and QoS Info are carried in PC5-S signalling messages and exchanged between two UEs as specified in clause 6.3.3. Based on the exchanged information, PFI is used to identify V2X service. When the receiving UE receives V2X service data over the established PC5 unicast link, the receiving UE determines the appropriate V2X service based on the PFI to forward the received V2X service data to the upper layer.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

[ . . . ]

5.6.1.4 Identifiers for Unicast Mode V2X Communication Over PC5 Reference Point

For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

A UE may establish multiple PC5 unicast links with a peer UE and use the same or different source Layer-2 IDs for these PC5 unicast links.

[ . . . ]

6.1 Control and User Plane Stacks 6.1.1 User Plane for NR PC5 Reference Point Supporting V2X Services Graphic 6.1.1-1 depicts a user plane for NR PC5 reference point, i.e. PC5 User Plane Protocol stack.

Figure 6:
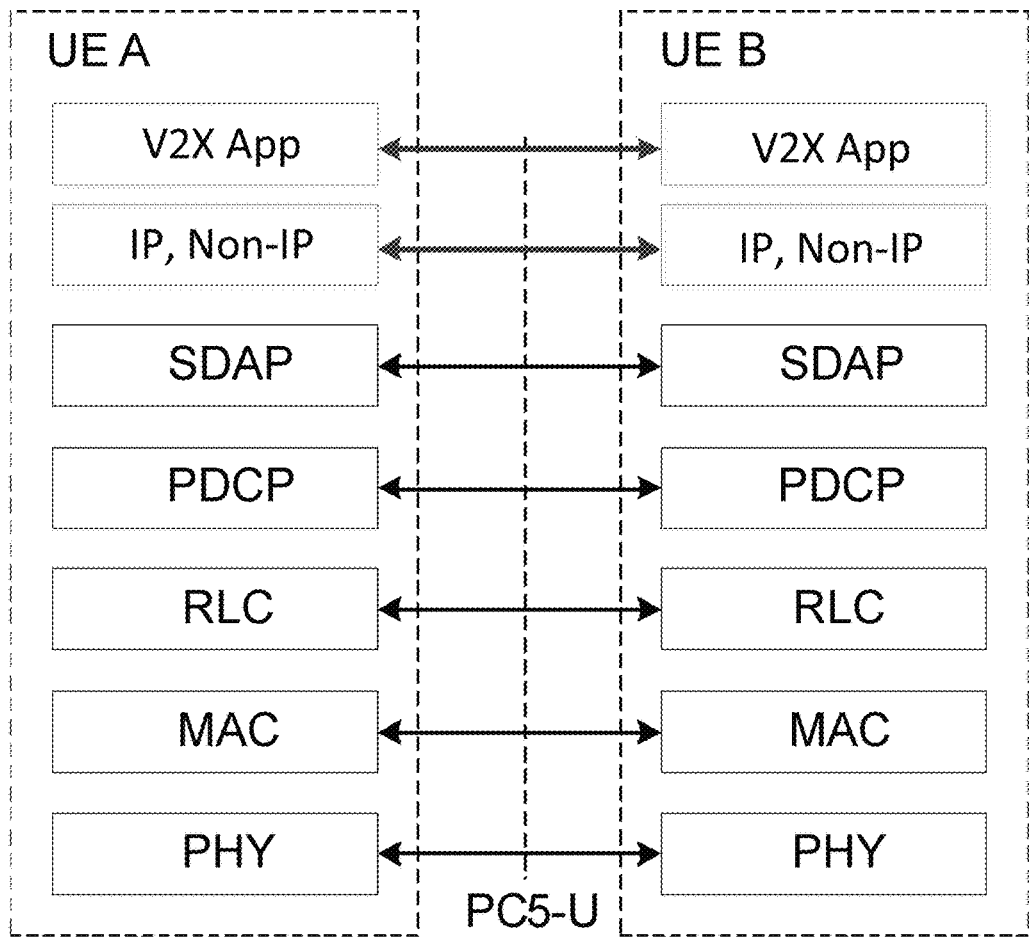
FIG. 6 is a reproduction of Graphic 6.1.1-1 of 3GPP TS 23.287 V16.2.0.

[Graphic 6.1.1-1 of 3GPP TS 23.287 V16.2.0, entitled "User Plane for NR PC5 reference point", is reproduced as FIG. 6]

IP and Non-IP PDCP SDU types are supported for the V2X communication over PC5 reference point.

For IP PDCP SDU type, only IPv6 is supported. The IP address allocation and configuration are as defined in clause 5.6.1.1.

The Non-IP PDCP SDU contains a Non-IP Type header, which indicates the V2X message family used by the application layer, e.g. IEEE 1609 family's WSMP [18], ISO defined FNTP [19].

NOTE: The Non-IP Type header and allowed values are defined in TS 24.587 [24].

The packets from V2X application layer are handled by the V2X layer before transmitting them to the AS layer, e.g. V2X layer maps the IP/Non IP packets to PC5 QoS Flow and marks the corresponding PFI.

6.1.2 Control Plane for NR PC5 Reference Point Supporting V2X Services

Editor's note: Whether PC5-S messages are carried in PC5 RRC signalling depends on RAN decision.

Graphic 6.1.2-1 depicts a control plane for NR PC5 reference point, i.e. PC5 Signalling Protocol stack.

Figure 7:
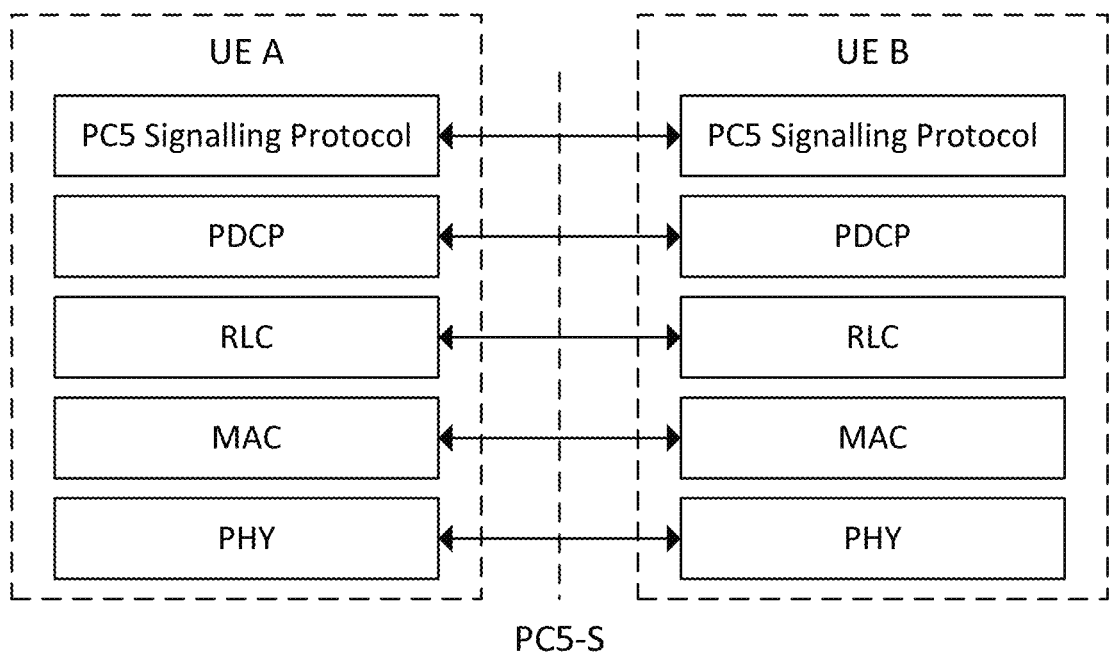
FIG. 7 is a reproduction of Graphic 6.1.2-1 of 3GPP TS 23.287 V16.2.0.

[Graphic 6.1.2-1 of 3GPP TS 23.287 V16.2.0, entitled "Control Plane for NR PC5 reference point", is reproduced as FIG. 7]

[ . . . ]

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Graphic 6.3.3.1-1 shows the layer-2 link establishment procedure for unicast mode of V2X communication over PC5 reference point.

Figure 8:
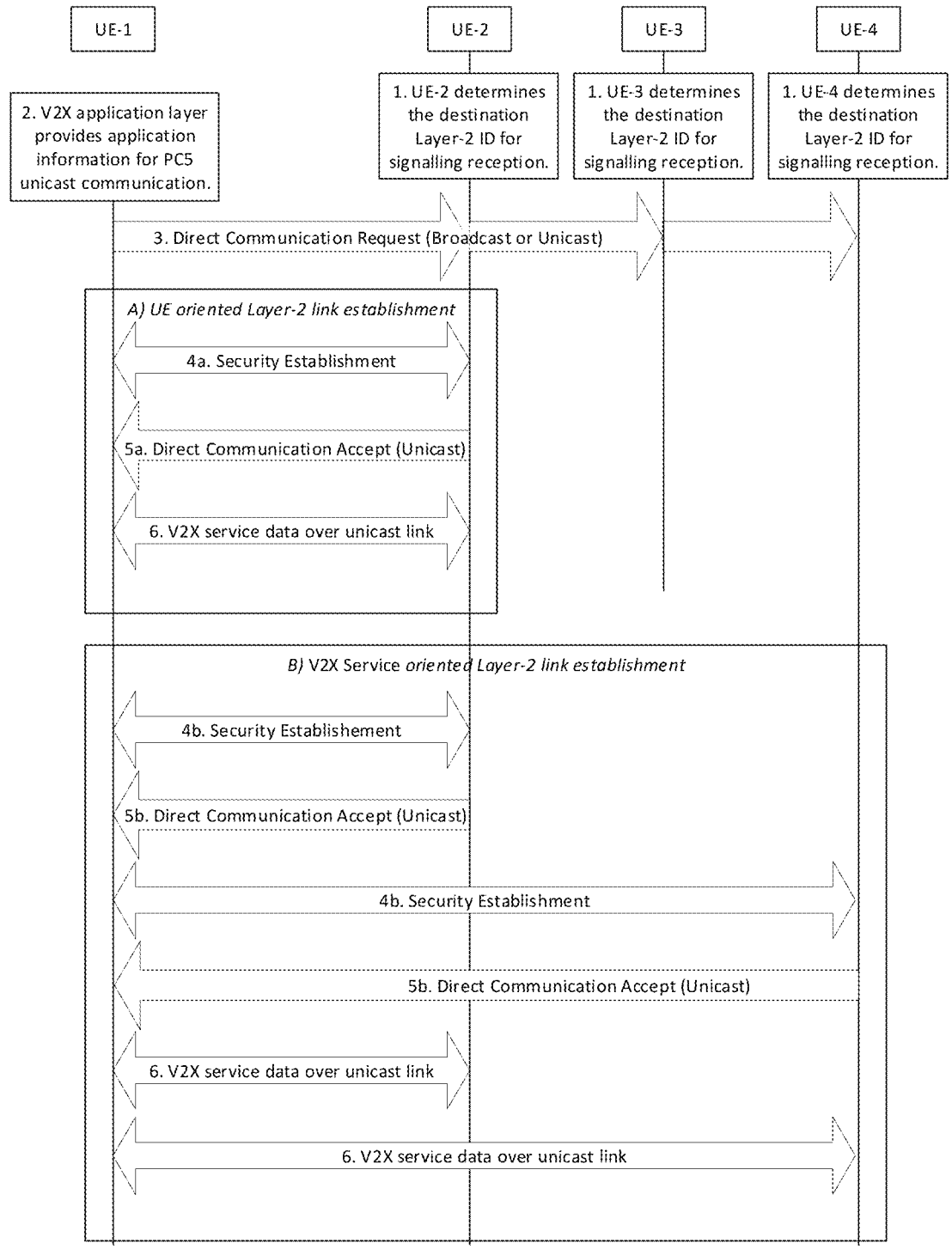
FIG. 8 is a reproduction of Graphic 6.3.3.1-1 of 3GPP TS 23.287 V16.2.0.

[Graphic 6.3.3.1-1 of 3GPP TS 23.287 V16.2.0, entitled "Layer-2 link establishment procedure", is reproduced as FIG. 8]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.

2. The V2X application layer in UE-1 provides application information for PC5 unicast communication. The application information includes the V2X service type (s) (e.g. PSID(s) or ITS-AID(s)) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service (s) requesting Layer-2 link establishment (e.g. PSID (s) or ITS-AID(s)).

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in Graphic 6.3.3.1-1).

The Direct Communication Accept message includes:
Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:
IP Address Configuration: For IP communication, IP address configuration is required for this link and indicates one of the following values:
"IPv6 Router" if IPv6 address allocation mechanism is supported by the target UE, i.e., acting as an IPv6 Router; or
"IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:
The PC5 Link Identifier, and PFI are provided to the AS layer, together with the V2X service data.
Optionally in addition, the Layer-2 ID information (i.e. source Layer-2 ID and destination Layer-2 ID) is provided to the AS layer.
NOTE 4: It is up to UE implementation to provide the Layer-2 ID information to the AS layer.
UE-1 sends the V2X service data using the source Layer-2 ID (i.e. UE-1's Layer-2 ID for this unicast link) and the destination Layer-2 ID (i.e. the peer UE's Layer-2 ID for this unicast link).
NOTE 5: PC5 unicast link is bi-directional, therefore the peer UE of UE-1 can send the V2X service data to UE-1 over the unicast link with UE-1.

3GPP TS 24.587 specifies Stage 3 PC5 unicast link establishment procedure as follows:

6.1.2.2 PC5 Unicast Link Establishment Procedure
6.1.2.2.1 General
The PC5 unicast link establishment procedure is used to establish a PC5 unicast link between two UEs. The UE sending the request message is called the "initiating UE" and the other UE is called the "target UE".

Editor's note: The details about security procedure defined by SA3 are FFS.
Editor's note: The details of the IEs of the following messages are FFS.

6.1.2.2.2 PC5 Unicast Link Establishment Procedure Initiation by Initiating UE

Editor's note: This section needs to be revisited after SA3 have determined the full set of security requirements for unicast link establishment.

The initiating UE shall meet the following pre-conditions before initiating this procedure:
a) a request from upper layers to transmit the packet for V2X service over PC5;
b) the link layer identifier for the initiating UE (i.e. layer 2 ID used for unicast communication) is available (e.g. pre-configured or self-assigned);
c) the link layer identifier for the unicast initial signaling (i.e. destination layer 2 ID used for unicast initial signaling) is available to the initiating UE (e.g. pre-configured, obtained as specified in clause 5.2.3 or known via prior V2X communication);
d) the initiating UE is either authorised for V2X communication over PC5 in NR in the serving PLMN, or has a valid authorization for V2X communication over PC5 in NR when not served by E-UTRAN and not served by NR; and
e) there is no existing PC5 unicast link for the pair of peer application layer IDs and the network layer protocol of this PC5 unicast link are identical to those required by the upper layer in the initiating UE for this V2X service.

In order to initiate the PC5 unicast link establishment procedure, the initiating UE shall create a DIRECT LINK ESTABLISHMENT REQUEST message. The initiating UE:
a) shall include the source user info set to the initiating UE's application layer ID received from upper layers;

b) shall include the V2X service identifier received from upper layer;

c) may include the target user info set to the target UE's application layer ID if received from upper layers; and d) shall include the security establishment information.

Editor's note: The parameters in the security establishment information will be defined by SA3.

After the DIRECT LINK ESTABLISHMENT REQUEST message is generated, the initiating UE shall pass this message to the lower layers for transmission along with the initiating UE's Layer 2 ID for unicast communication and the destination layer 2 ID used for unicast initial signaling, and start timer T5000. The UE shall not send a new DIRECT LINK ESTABLISHMENT REQUEST message to the same target UE identified by the same application layer ID while timer T5000 is running.

Figure 9:
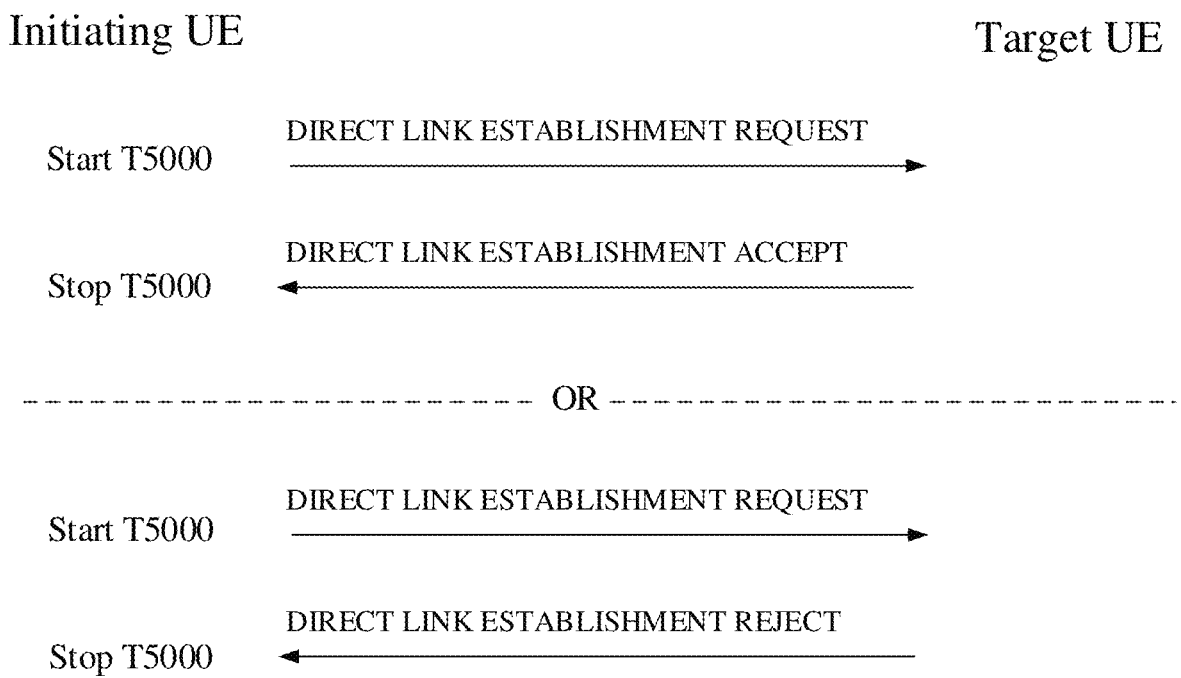
FIG. 9 is a reproduction of Graphic 6.1.2.2.2 of 3GPP TS 24.587 V16.0.0.

[Graphic 6.1.2.2.2 of 3GPP TS 24.587 V16.0.0, entitled "PC5 unicast link establishment procedure", is reproduced as FIG. 9]

6.1.2.2.3 PC5 Unicast Link Establishment Procedure Accepted by the Target UE

Upon receipt of a DIRECT LINK ESTABLISHMENT REQUEST message, the target UE shall assign a layer-2 ID for this PC5 unicast link and store this assigned layer-2 ID and the source layer 2 ID used in the transport of this message provided by the lower layers. This pair of layer-2 IDs is associated with a PC5 unicast link context.

If:

a) the target user info IE is included in the DIRECT LINK ESTABLISHMENT REQUEST message and this IE includes the target UE's application layer ID; or b) the target user info IE is not included in the DIRECT LINK ESTABLISHMENT REQUEST message and the target UE is interested in the V2X service identified by the V2X service identifier in the DIRECT LINK ESTABLISHMENT REQUEST message;

then the target UE shall either identify an existing security context with the initiating UE, or establish a new security context by performing one or more PC5 unicast link authentication procedures as specified in clause 6.1.2.6, and performing the PC5 unicast link security mode control procedure as specified in clause 6.1.2.7.

Upon successful completion of the PC5 unicast link security mode control procedure, in order to determine whether the DIRECT LINK ESTABLISHMENT REQUEST message can be accepted or not, in case of IP communication, the target UE checks whether there is at least one common IP address configuration option supported by both the initiating UE and the target UE.

If the target UE accepts the PC5 unicast link establishment procedure, the target UE shall create a DIRECT LINK ESTABLISHMENT ACCEPT message. The target UE:

a) shall include the source user info set to the target UE's application layer ID received from upper layers;

b) shall include a PQFI and the corresponding PC5 QoS parameters;

c) may include an IP address configuration IE set to one of the following values if IP communication is used:
  1) "IPv6 router" if only IPv6 address allocation mechanism is supported by the target UE, i.e. acting as an IPv6 router; or
  2) "IPv6 address allocation not supported" if IPv6 address allocation mechanism is not supported by the target UE;

d) may include a link local IPv6 address IE formed locally based on IETF RFC 4862 [16] if IP address configuration IE is set to "IPv6 address allocation not supported" and the received DIRECT LINK ESTABLISHMENT REQUEST message included a link local IPv6 address IE.

6.1.2.2.4 PC5 Unicast Link Establishment Procedure Completion by the Initiating UE Upon receipt of the DIRECT LINK ESTABLISHMENT ACCEPT message, the initiating UE shall stop timer T5000 and store the source layer-2 ID and the destination Layer-2 ID used in the transport of this message provided by the lower layers. This pair of layer-2 IDs shall be associated with a PC5 unicast link context. From this time onward the initiating UE shall use the established link for V2X communication over PC5 and additional PC5 signalling messages to the target UE.

6.1.2.2.5 PC5 Unicast Link Establishment Procedure not Accepted by the Target UE If the DIRECT LINK ESTABLISHMENT REQUEST message cannot be accepted, the target UE shall send a DIRECT LINK ESTABLISHMENT REJECT message. The DIRECT LINK ESTABLISHMENT REJECT message contains a PC5 signalling protocol cause IE set to one of the following cause values:

1 direct communication to the target UE not allowed;

3 conflict of Layer 2 ID for unicast communication is detected;

5 lack of resources for proposed link; or

111 protocol error, unspecified.

If the target UE is not allowed to accept this request .e.g. based on operator policy or service authorisation provisioning, the target UE shall send a DIRECT LINK ESTABLISHMENT REJECT message containing PC5 signalling protocol cause value #1 "direct communication to the target UE not allowed".

For a received DIRECT LINK ESTABLISHMENT REQUEST message from a Layer 2 ID (for unicast communication), if the target UE already has an existing link established to the UE known to use this Layer 2 ID or is currently processing a DIRECT LINK ESTABLISHMENT REQUEST message from the same Layer 2 ID, but with user info different from the user info IE included in this new incoming message, the target UE shall send a DIRECT LINK ESTABLISHMENT REJECT message containing PC5 signalling protocol cause value #3 "conflict of Layer 2 ID for unicast communication is detected".

If the PC5 unicast link establishment fails due to the congestion problems or other temporary lower layer problems causing resource constraints, the target UE shall send a DIRECT LINK ESTABLISHMENT REJECT message containing PC5 signalling protocol cause value #5 "lack of resources for proposed link".

For other reasons that causing the failure of link establishment, the target UE shall send a DIRECT LINK ESTABLISHMENT REJECT message containing PC5 signalling protocol cause value #111 "protocol error, unspecified".

Upon receipt of the DIRECT LINK ESTABLISHMENT REJECT message, the initiating UE shall stop timer T5000 and abort the PC5 unicast link establishment procedure. If the PC5 signalling protocol cause value in the DIRECT LINK ESTABLISHMENT REJECT message is #1 "direct communication to the target UE not allowed" or #5 "lack of resources for proposed link", then the UE shall not attempt to start PC5 unicast link establishment with the same target UE at least for a time period T.

NOTE: The length of time period T is UE implementation specific and can be different for the case when the UE receives PC5 signalling protocol cause value #1 "direct communication to the target UE not allowed" or when the UE receives PC5 signalling protocol cause value #5 "lack of resources for proposed link".

6.1.2.2.6 Abnormal Cases 6.1.2.2.6.1 Abnormal Cases at the Initiating UE

If timer T5000 expires, the initiating UE shall retransmit the DIRECT LINK ESTABLISHMENT REQUEST message and restart timer T5000. After reaching the maximum number of allowed retransmissions, the initiating UE shall abort the PC5 unicast link establishment procedure and may notify the upper layer that the target UE is unreachable.

NOTE: The maximum number of allowed retransmissions is UE implementation specific.

If the need to establish a link no longer exists before the procedure is completed, the initiating UE shall abort the procedure.

6.1.2.2.6.2 Abnormal Cases at the Target UE

For a received DIRECT LINK ESTABLISHMENT REQUEST message from a source Layer 2 ID (for unicast communication), if the target UE already has an existing link established to the UE known to use this source Layer 2 ID and the new request contains an identical source user info as the known user, the UE shall process the new request. However, the target UE shall only delete the existing link context after the new link establishment procedure succeeds.

3GPP TR 23.752 introduces the issue on support of UE-to-UE Relay and related solutions for a new release (i.e. Release 17) as follows:

5.4 Key Issue #4: Support of UE-to-UE Relay 5.4.1 General Description

This key issue intends to support for UE-to-UE Relay, including support for in coverage and out of coverage operation.

At least the following aspects need to be considered in potential solutions:

How to (re)-select a UE-to-UE Relay UE in proximity?
Whether and how for the network can control the UE-to-UE Relay operation, at least including how to:
Authorize the UE-to-UE Relay, e.g. authorize a UE as UE-to-UE Relay?
Provide the visibility of source/target UE and the UE-to-UE Relay to the network for the purpose of, e.g. charging?
How to establish the connection between the source UE and the target UEs via UE-to-UE Relay?
How to provide end-to-end QoS framework to satisfy the QoS requirements (such as data rate, reliability, latency)?
How to enhance the system architecture to provide the security protection for relayed connection?
How to provide a mechanism for path changing in case of e.g. UE-to-UE Relay changes?
NOTE 1: For the involvement of NG-RAN, coordination with RAN WGs is needed.
NOTE 2: For security aspects, coordination with SA3 is needed.

[ . . . ]

6.8 Solution #8: UE-to-UE Relay Selection without Relay Discovery 6.8.1 Description This proposal aims to ensure the relay discovery between the source and the target UE shall not be dependent on how the relay forward traffic between the source and the target UE, e.g. L2 or L3 relaying. This solution relies on the concept that the UE-to-UE discovery and selection can be integrated into the unicast link establishment procedure as described in clause 6.3.3 of TS 23.287 [5].

A new field is proposed to be added in the direct communication request to indicate whether relays can be used in the communication. The field can be called relay_indication. When a UE wants to broadcast a direct communication request, it indicates in the message whether a UE-to-UE relay could be used. For Release 17, it is assumed that the value of the indication is restricted to single hop.

When a UE-to-UE relay receives a direct communication request with the relay_indication set, then it shall decide whether to forward the request (i.e. broadcast this request in its proximity), according to e.g. the QoS requirements in the request, the current traffic load of the relay, the radio conditions between the source UE and the relay UE, or some other policies (e.g. it only serves some specific UEs or services).

It may be the situation where multiple UE-to-UE relays can be used to reach the target UE or the target UE may also directly receive the direct communication request from the source UE. The target UE may choose which one to reply according to e.g. signal strength, local policy (e.g. traffic load of the UE-to-UE relays) or operator policies (e.g. always prefer direct communication or only use some specific UE-to-UE relays).

The source UE may receive the direct communication accept message from multiple UE-to-UE relays and also from the target UE directly, the source UE chooses the communication path according to e.g. signal strength, local policy (e.g. traffic load of the UE-to-UE relays) or operator policies (e.g. always prefer direct communication or only use some specific UE-to-UE relays).

6.8.2 Procedures

Figure 10:
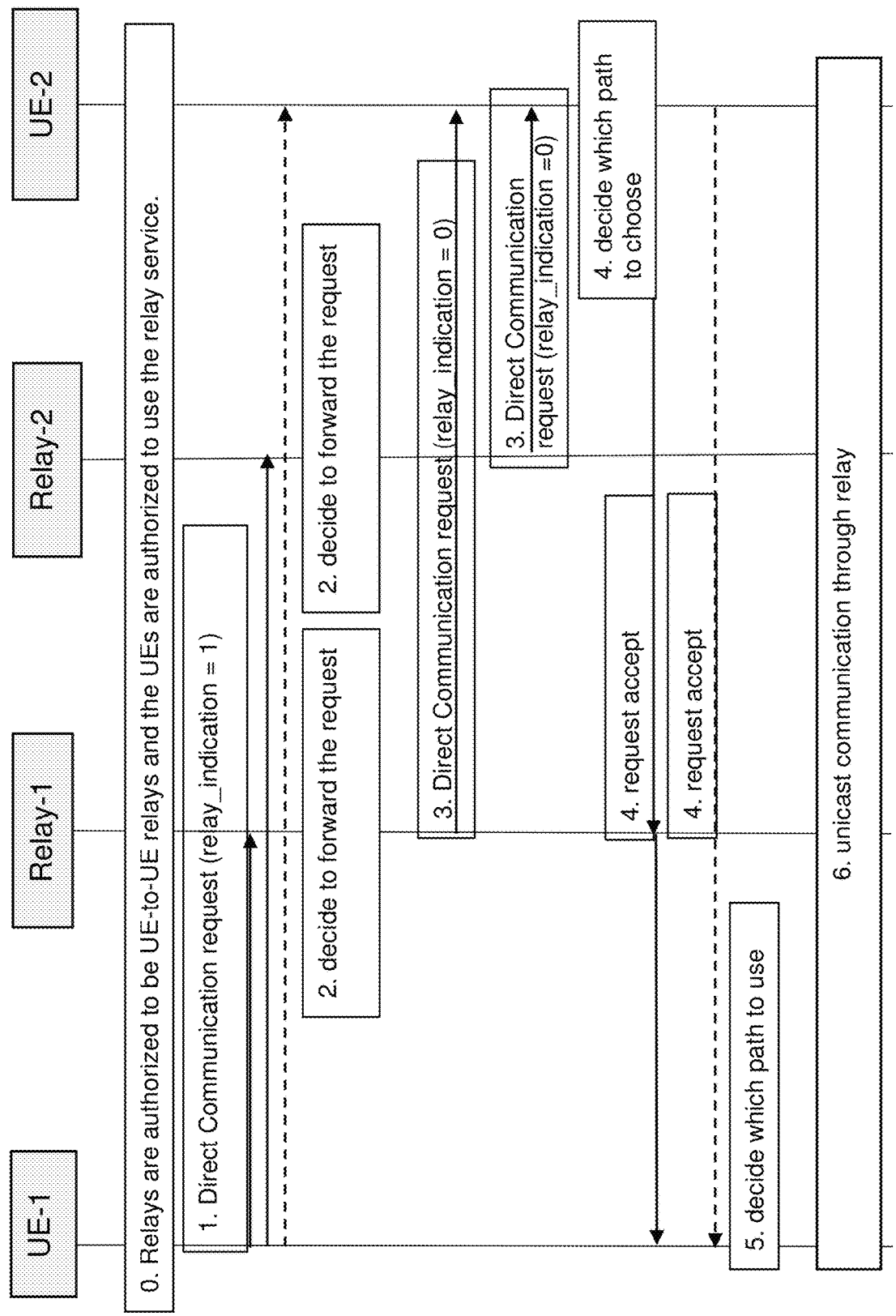
FIG. 10 is a reproduction of Graphic 6.8.2-1 of 3GPP TR 23.752 V0.3.0.

[Graphic 6.8.2-1 of 3GPP TR 23.752 V0.3.0, entitled "5G ProSe UE-to-UE relay selection", is reproduced as FIG. 10]

Graphic 6.8.2-1 illustrates the procedure of the proposed method.

0. UEs are authorized to use the service provided by the UE-to-UE relays. UE-to-UE relays are authorized to provide service of relaying traffic among UEs. The authorization and the parameter provisioning can use solutions for KI #8.
1. UE-1 wants to establish unicast communication with UE-2 and the communication can be either through direct link with UE-2 or via a UE-to-UE relay. Then UE-1 broadcasts directly communication request with relay_indication=1. The request will be received by relay-1, relay-2. The request may also be received by UE-2 if it is in the proximity of UE-1.
2. Relay-1 and relay-2 decide to forward the request. They broadcast the message in their proximity with relay_indication=0. If a relay receives this message, it will just drop it.
3. UE-2 receives the requests from relay-1 and relay-2.
4. UE-2 chooses relay-1 and replies with request accept. If UE-2 directly receives the direct communication request from UE-1, it may choose to setup a direct communication link by sending the request accept directly to UE-1. The response message includes indication on the type of communication link being established (e.g. via relay or direct).
5. UE-1 receives the request accept from relay-1. UE-1 chooses path according to e.g. policies (e.g. always choose direct path if it is possible), signal strength, etc. If UE-1 receives request accept directly from UE-2, it may choose to setup a direct L2 link as described in clause 6.3.3 of TS 23.287 [5], then step 6 is skipped.

6. UE-1 and UE-2 setup communication link through chosen UE-to-UE relay. The link setup information may vary depending on the type of relay, e.g. L2 or L3 relaying.

NOTE 1: In order to make a relay or path selection, the source UE can setup a timer after sending out the direct communication request for collecting the corresponding request accept messages before making a decision. Similarly, the target UE can also setup a timer after receiving the first copy of the direct communication request for collecting multiple copies of the request from different paths before making a decision.

NOTE 2: In the first time when a UE receives a message from a UE-to-UE relay, the UE needs to verify if the relay is authorized be a UE-to-UE relay. The verification details and the how to secure the communication between two UEs through a UE-to-UE relay is to be defined by SA WG3.

6.8.3 Impacts on Existing Nodes and Functionality

UE impacts to support new Relay related functions.

6.9 Solution #9: Connection Establishment Via UE-to-UE Layer-2 Relay 6.9.1 Description Using the solution described in this clause, a UE-to-UE Relay enables the discovery of a source UE by a target UE. A UE-to-UE Relay is authorized to relay messages between two UEs over the PC5 interface via authorization and provisioning, as defined in clause 6.Y Solution for Key Issue #4: UE-to-UE Relay Authorization and Provisioning.

The source UE announces its supported applications or discovers a target UE using a known discovery mechanism, e.g. using user-oriented or service-oriented methods as defined in TS 23.287 [5].

The UE-to-UE Relay listens for ProSe applications advertisements (e.g. Direct Discovery or Direct Communication Request messages) from surrounding UEs and if a broadcasted application matches one of the applications from its provisioned relay policy/parameters, the UE-to-UE Relay advertises it as a relayed application by adding a relay indication to the message.

A target UE discovers a source UE via a UE-to-UE Relay. The target UE receives a broadcast Direct Communication Request message with a relay indication.

A secured "extended" PC5 link is set up between the source UE and the target UE via the UE-to-UE Relay. The source/target UEs do not know their respective peer UE's L2 IDs. Source/Target UEs send messages to the UE-to-UE Relay and receive messages through the UE-to-UE Relay. However, the security association and the PC5 unicast link are established directly between the source UE and target UE. The UE-to-UE Relay forwards the messages in opaque mode, without the ability to read, modify their content or replay them. The source/target UEs detect that the communication is going through a UE-to-UE Relay upon detecting a relay indication included in the received messages.

The UE-to-UE Relay assigns itself two Relay-L2 IDs when a unicast link is established between two peer UEs via the UE-to-UE Relay. The first Relay-L2 ID is used when forwarding a message to the target UE. The second Relay-L2 ID is used when forwarding a message to the source UE. The UE-to-UE Relay maintains a mapping table containing the mapping of peer UEs L2 IDs and the corresponding Relay-L2 IDs that have been self-assigned. When receiving a message, the UE-to-UE Relay uses its mappings table to find the source and destination IDs to be used to forward the message to the target UE. The UE-to-UE Relay uses the Relay-L2 ID specified in the destination field to find the related UE and uses the UE's L2 ID specified in the source field to find the related Relay-L2 ID. It then updates the source and destination fields of the received message with its corresponding UE's L2 ID and Relay-L2 ID before forwarding the message.

NOTE: Additional security-related parameters and procedures may be needed for the protection of relay related messages. Their definitions need to be coordinated with SA WG3.

6.9.2 Procedures

The two methods defined in TS 23.287 [5], i.e. service-oriented and user-oriented are supported using the procedure described in this clause.

Graphic 6.9.2-1 shows the peer discovery and unicast link establishment over PC5 reference point via a UE-to-UE Relay.

Figure 11:
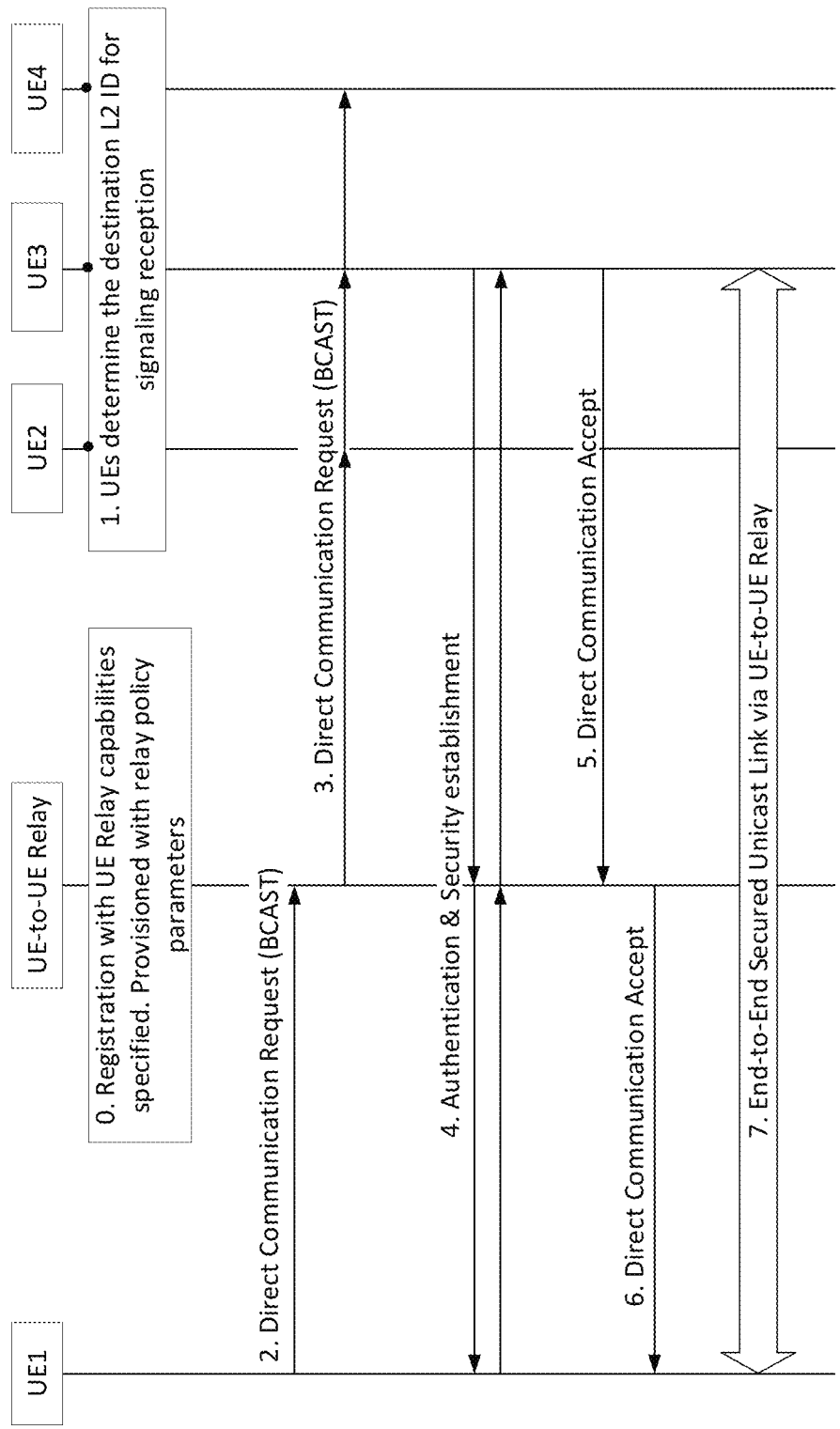
FIG. 11 is a reproduction of Graphic 6.9.2-1 of 3GPP TR 23.752 V0.3.0.

[Graphic 6.9.2-1 of 3GPP TR 23.752 V0.3.0, entitled "Connection establishment procedure via a UE-to-UE Relay", is reproduced as FIG. 11]

0. UE-to-UE Relay registers with the network and specifies its UE-to-UE Relay capabilities. UE-to-UE Relay is provisioned from the network with relay policy parameters and with a unique Relay identifier (RID).

1. The target UEs (i.e. UE2, UE3 and UE4) determine the destination Layer-2 ID for signalling reception for PC5 unicast link establishment as specified in TS 23.287 [5] clause 5.6.1.4. The destination Layer-2 ID is configured with the target UEs as specified in TS 23.287 [5] clause 5.1.2.1.

2. On the source UE (i.e. UE1), the application layer provides information to the ProSe layer for PC5 unicast communication (e.g. broadcast Layer-2 ID, ProSe Application ID, UE's Application Layer ID, target UE's Application Layer ID, relay applicable indication), as specified in TS 23.287 [5] clause 6.3.3.1.

3. ProSe layer triggers the peer UE discovery mechanism by sending a broadcast Direct Communication Request message. The message is sent using the source Layer-2 ID and broadcast Layer-2 ID as destination, and includes other parameters related to the application offered, as specified in TS 23.287 [5] clause 6.3.3.1.

4. The UE-to-UE Relay receives the broadcast Direct Communication Request message and verifies if it's configured to relay this application, i.e. it compares the announce ProSe Application ID with its provisioned relay policy/parameters and, if it matches, the UE-to-UE Relay assigns itself a Relay-Layer-2 ID (e.g. R-L2 ID-a) for UE1 (i.e. related to UE1's L2 ID). These 2 IDs (UE1's Layer-2 ID and Relay-Layer-2 ID-a) are saved in a local mapping table. The UE-to-UE Relay overrides the source field of the message with its R-L2 ID-a and adds its unique relay identifier (RID) as a relay indication. This relay indication is added by the UE-to-UE Relay only on broadcast messages since these messages are sent in clear text (i.e. without any encryption or integrity protection) thus may be modified. The UE-to-UE Relay proceeds in forwarding the broadcast Direct Communication Request message received from the source UE.

5. Target UE3 is interested in the announced application thus, it triggers the authentication and security establishment with UE1, via the UE-to-UE Relay. UE3 keeps track of the Relay's identifiers, i.e. R-L2 ID-a and RID. UE3 sends the RID in a security protected message during the authentication and security establishment to inform UE1 that the communication is traversing the UE-to-UE Relay identified by RID.

UE-to-UE Relay receives the message from UE3 and uses the R-L2 ID-a specified in the destination field to find the related UE (i.e. UE1 in this case) in its mapping table.
UE-to-UE Relay assigns itself a new Layer-2 ID (e.g. R-L2 ID-b) for UE3 and stores the mapping between UE3's L2 ID and R-L2 ID-b.
UE-to-UE Relay sets the source field of the message to R-L2 ID-b and sets the destination field to UE1's Layer-2 ID (i.e. L2 ID1) retrieved from the mapping entry. UE-to-UE Relay sends the message to UE1.
UE1 receives the authentication message and keeps track of R-L2 ID-b and RID. R-L2 ID-b is used as the destination on subsequent messages destined to UE3 and sent via the UE-to-UE Relay.
Authentication and security establishment messages are exchanged between UE1 and UE3 via the UE-to-UE Relay. UE-to-UE Relay changes the source/destination Layer-2 IDs based on the information saved in its local mapping table.

Editor's note: The Details of the authentication and security procedure will be investigated by SA WG3 group.
 6. Once the security is established, UE3 completes the unicast link establishment by sending a Direct Communication Accept message.
 7. UE-to-UE Relay receives the message and sets the source field of the message to the R-L2 ID-b as found in the mapping entry and sets the destination field to the UE1's L2 ID also from the mapping entry. UE-to-UE Relay sends the modified message to UE1.
 8. An "extended" unicast link is established between UE1 and UE3, via the UE-to-UE Relay. The extended link is secured end to end, i.e. a security association has been created between UE1 and UE3. Confidentiality and/or integrity/replay protected messages (i.e. data or PC5-S) may be exchanged between UE1 and UE3. The UE-to-UE Relay is not involved in the security association thus it cannot read nor modify the secured portion of the message (which excludes the source and destination fields).
 Editor's note: The details of protocol stack and PC5 link establishment is FFS and need to be co-ordinated and confirmed by RAN WG2 group.

6.9.3 Impacts on Services, Entities and Interfaces
The solution has impacts in the following entities:
UE:
 Needs to support procedures for ProSe 5G UE-to-UE Relay and communications via a ProSe 5G UE-to-UE Relay.

Figure 12:
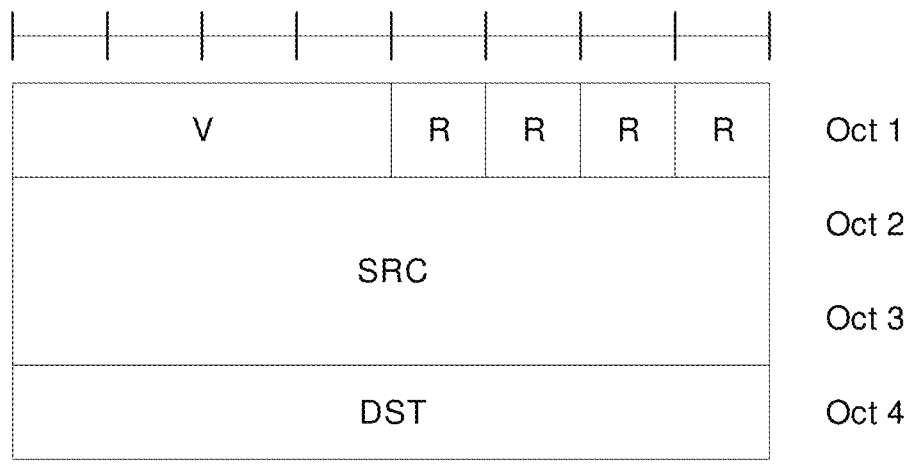
FIG. 12 is a reproduction of Graphic 6.1.6-1 of 3GPP TS 38.321 V16.1.0
Figure 13:
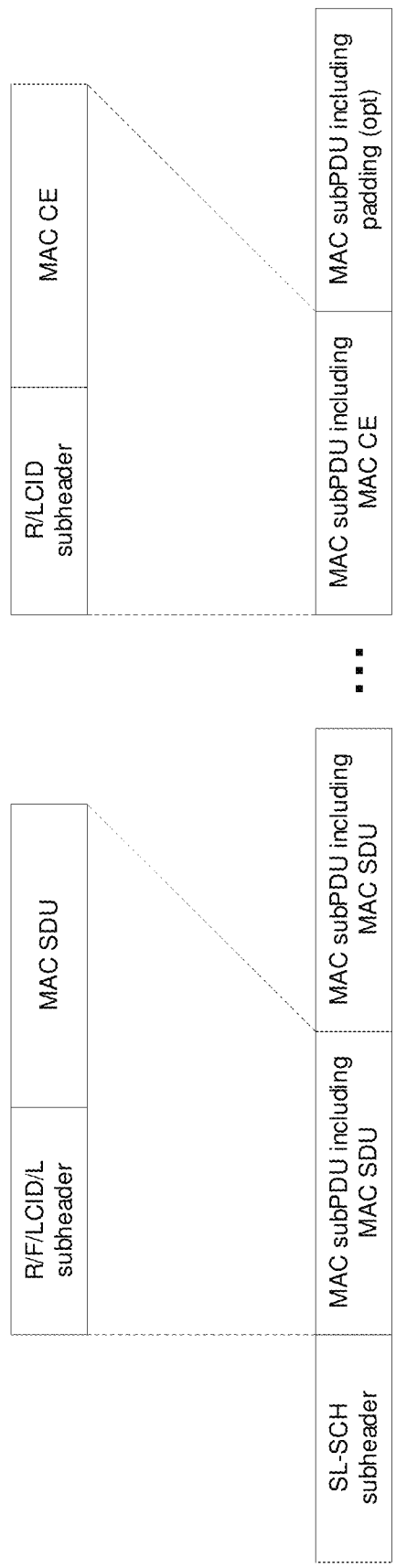
FIG. 13 is a reproduction of Graphic 6.1.6-2 of 3GPP TS 38.321 V16.1.0.
Figure 15:
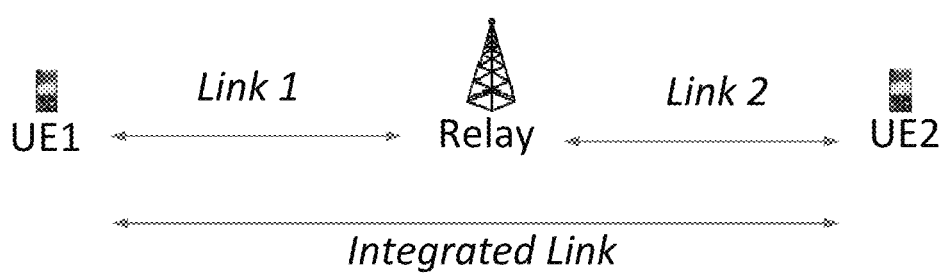
FIG. 15 illustrates an example of an integrated PC5 unicast link via a UE-to-UE Relay according to one embodiment.

3GPP TS 38.321 specifies the sidelink Medium Access Control (MAC) Packet Data Unit (PDU) format as follows:
6.1.6 MAC PDU (SL-SCH)
A MAC PDU consists of one SL-SCH subheader and one or more MAC subPDUs. Each MAC subPDU consists of one of the following:
 A MAC subheader only (including padding);
 A MAC subheader and a MAC SDU;
 A MAC subheader and a MAC CE;
 A MAC subheader and padding.
The MAC SDUs are of variable sizes.
Each MAC subheader except SL-SCH subheader corresponds to either a MAC SDU, a MAC CE, or padding.
 The SL-SCH subheader is of a fixed size and consists of the seven header fields V/R/R/R/R/SRC/DST.
  [Graphic 6.1.6-1 of 3GPP TS 38.321 V16.1.0, entitled "SL-SCH MAC subheader", is reproduced as FIG. 12]
A MAC subheader except for padding consists of the four header fields R/F/LCID/L as depicted in Graphic 6.1.2-1 (with 8-bit L field) and Graphic 6.1.2-2 (with 16-bit L field).
A MAC subheader for MAC CE and padding consists of the two header fields R/LCID as depicted in Graphic 6.1.2-3.
SL MAC subPDU(s) with MAC SDU(s) is placed after the SL-SCH subheader and before the MAC subPDU with a MAC CE and the MAC subPDU with padding in the MAC PDU as depicted in Graphic 6.1.6-2. SL MAC subPDU with a MAC CE is placed after all the MAC subPDU(s) with MAC SDU and before the MAC subPDU with padding in the MAC PDU as depicted in Graphic 6.1.6-2. The size of padding can be zero.
  [Graphic 6.1.6-2 of 3GPP TS 38.321 V16.1.0, entitled "Example of a SL MAC PDU", is reproduced as FIG. 13]
A maximum of one MAC PDU can be transmitted per TB per MAC entity.
[ . . . ]
6.2.4 MAC Subheader for SL-SCH
The MAC subheader consists of the following fields:
 V: The MAC PDU format version number field indicates which version of the SL-SCH subheader is used. The V field size is 4 bits;
 SRC: The SRC field carries the 16 most significant bits of the Source Layer-2 ID field set to the identifier provided by upper layers as defined in TS 23.287 [19]. The length of the field is 16 bits;
 DST: The DST field carries the 8 most significant bits of the Destination Layer-2 ID set to the identifier provided by upper layers as defined in TS 23.287 [19]. [If the V field is set to "1", this identifier is a unicast identifier. If the V field is set to "2", this identifier is a groupcast identifier. If the V field is set to "3", this identifier is a broadcast identifier. The length of the field is 8 bits;
 LCID: The Logical Channel ID field identifies the logical channel instance or the type of the corresponding MAC CE within the scope of one Source Layer-2 ID and Destination Layer-2 ID pair of the corresponding MAC SDU or padding as described in Tables 6.2.4-1 for SL-SCH. There is one LCID field per MAC subheader except for SL-SCH subheader. The LCID field size is 6 bits;
 L: The Length field indicates the length of the corresponding MAC SDU in bytes. There is one L field per MAC subheader except for subheaders corresponding to the SL-SCH subheader or padding. The size of the L field is indicated by the F field;
 F: The Format field indicates the size of the Length field. There is one F field per MAC subheader except for subheaders corresponding to the SL-SCH subheader or padding. The size of the F field is 1 bit. The value 0 indicates 8 bits of the Length field. The value 1 indicates 16 bits of the Length field;
 R: Reserved bit, set to 0.
The MAC subheader is octet aligned.
  [Table 6.2.4-1 of 3GPP TS 38.321 V16.1.0, entitled "Values of LCID for SL-SCH", is reproduced as FIG. 14]
 Key issue #4 in 3GPP TR 23.752 V0.3.0 describes support of UE-to-UE Relay in the following release (i.e. Release 17), which means a relay may be used to support data communication between two UEs in case these two UEs cannot communicate with each other directly. It is supposed that a UE-to-UE Relay needs to establish one PC5 unicast link with each of a Source UE and a Target UE such that the integrated PC5 unicast link between the Source UE and the Target UE can support the concerned ProSe service as illustrated in FIG. 15.

When a Source UE requires a UE-to-UE Relay service, the Source UE may or may not know the Layer-2 ID of the Target UE. If the Source UE knows the Layer-2 ID of the Target UE, it would be beneficial for the Source UE to include the Layer-2 ID of the Target UE in the Direct Communication Request message (or a DIRECT LINK ESTABLISHMENT REQUEST message) sent by the Source UE in order to connect with a UE-to-UE Relay so that the UE-to-UE Relay can transmit a new Direct Communication Request message (or a new DIRECT LINK ESTABLISHMENT REQUEST message) directly addressed to the Layer-2 ID of the Target UE. By this way, at least other UEs do not need to process the new Direct Communication Request message (or the new DIRECT LINK ESTABLISHMENT REQUEST message).

In one embodiment, the Direct Communication Request message (or the DIRECT LINK ESTABLISHMENT REQUEST message) transmitted by the Source UE may also include the Source UE's Application Layer Identity (ID), the Target UE's Application Layer ID, and/or Service Info of a ProSe service, in addition to the Layer-2 ID of the Target UE. The Service Info of the ProSe service may be an identity of the ProSe service, e.g. a Provider Service Identifier (PSID) or an Intelligent Transport Systems-Application Identifier (ITS-AID). And, the new Direct Communication Request message (or the new DIRECT LINK ESTABLISHMENT REQUEST message) transmitted by the UE-to-UE Relay may also include the Source UE's Application Layer ID, the Target UE's Application Layer ID, and/or the Service Info of the ProSe service.

It is noted that a PC5-S message (e.g. the Direct Communication Request message or the Direct Communication Accept message) may be included in a MAC Service Data Unit (SDU), while each sidelink MAC Packet Data Unit (PDU) may include one header and at least one MAC SDU. The header may include a field SRC indicating (part of) a Source Layer-2 ID and a field DST indicating (part of) a Destination Layer-2 ID. A PC5-S message addressed to a Layer-2 ID may mean that the PC5-S message is included in a sidelink MAC PDU for transmission, where the field DST in a MAC header of the sidelink MAC PDU may be set to (part of) the Layer-2 ID.

Figure 16:
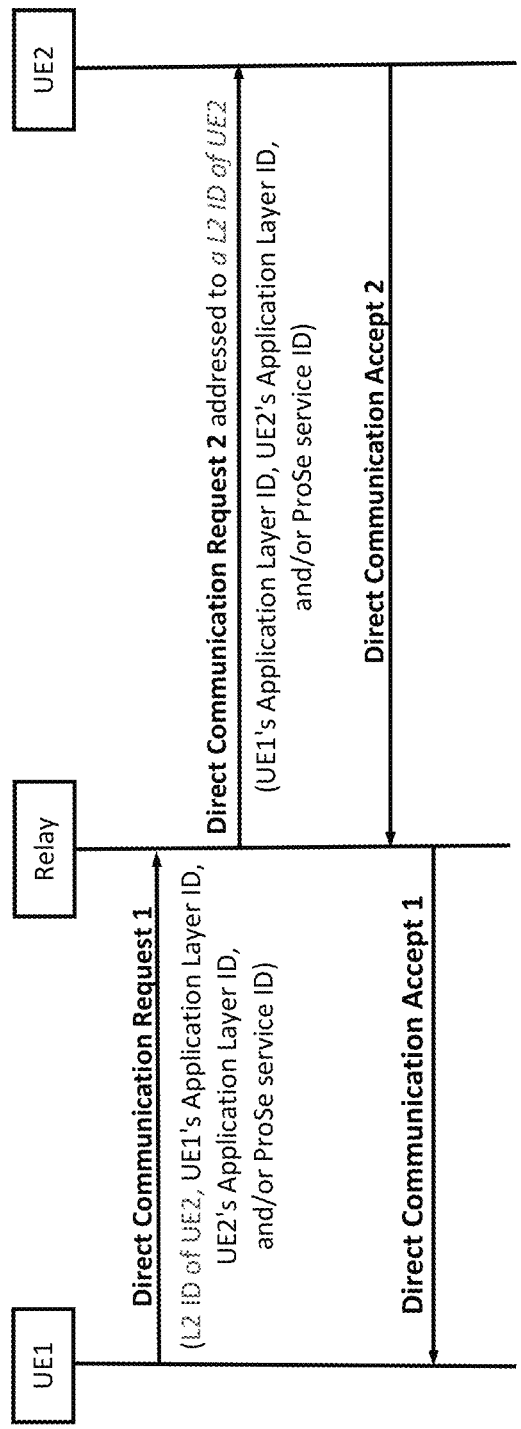
FIG. 16 illustrates an example of an integrated PC5 unicast link establishment procedure according to one embodiment.

FIG. 16 illustrates an example of the above integrated PC5 unicast link establishment procedure according to one embodiment.

Figure 17:
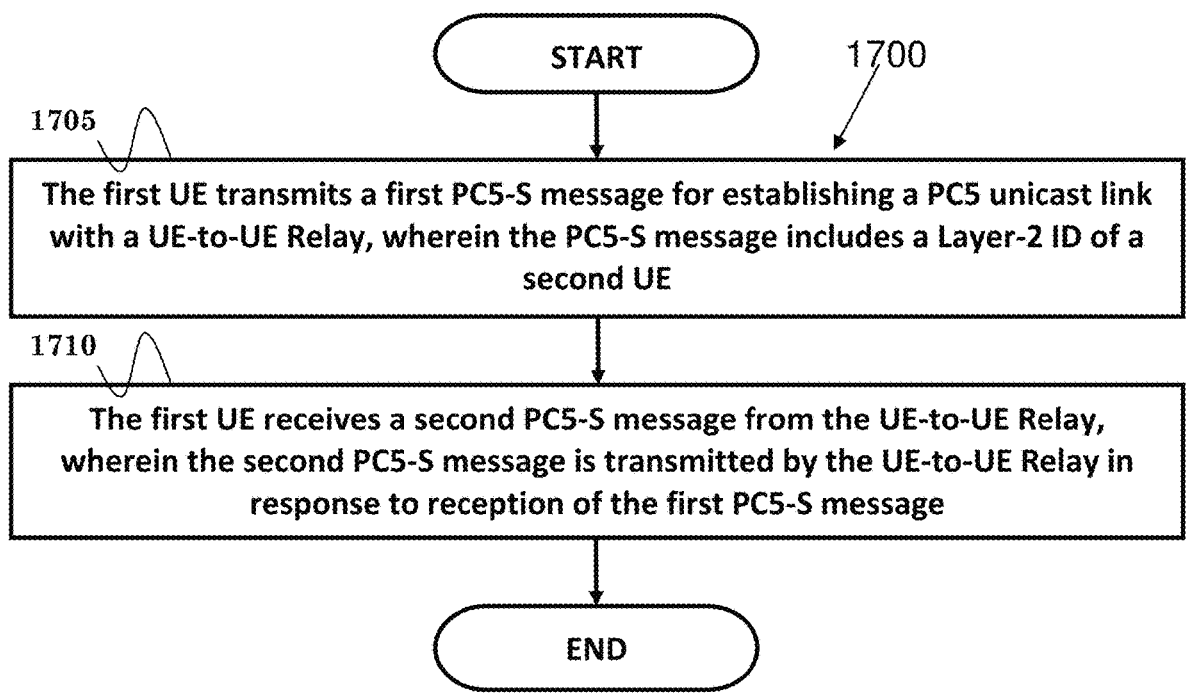
FIG. 17 is a flow chart according to one exemplary embodiment.

FIG. 17 is a flow chart 1700 according to one exemplary embodiment from the perspective of a first User Equipment (UE) to perform a PC5 unicast link establishment procedure. In step 1705, the first UE transmits a first PC5-S message for establishing a PC5 unicast link with a UE-to-UE Relay, wherein the PC5-S message includes a Layer-2 ID of a second UE. In step 1710, the first UE receives a second PC5-S message from the UE-to-UE Relay, wherein the second PC5-S message is transmitted by the UE-to-UE Relay in response to reception of the first PC5-S message.

In one embodiment, the first PC5-S message could be addressed to a default Destination Layer-2 ID associated with a UE-to-UE Relay service. The first PC5-S message may also include the first UE's Application Layer ID, and/or the second UE's Application Layer ID. Furthermore, the first PC5-S message may include Service Info of a ProSe service. The Service Info of the ProSe service may be an identity of the ProSe service.

In one embodiment, the first PC5-S message may be a Direct Communication Request message or a DIRECT LINK ESTABLISHMENT REQUEST message. The second PC5-S message may be a Direct Communication Accept message or a DIRECT LINK ESTABLISHMENT ACCEPT message.

Referring back to FIGS. 3 and 4, in one exemplary embodiment of a first UE to perform a PC5 unicast link establishment procedure. The first UE 300 includes a program code 312 stored in the memory 310. The CPU 308 could execute program code 312 to enable the first UE (i) to transmit a first PC5-S message for establishing a PC5 unicast link with a UE-to-UE Relay, wherein the PC5-S message includes a Layer-2 Identity (ID) of a second UE, and (ii) to receive a second PC5-S message from the UE-to-UE Relay, wherein the second PC5-S message is transmitted by the UE-to-UE Relay in response to reception of the first PC5-S message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) to perform a PC5 unicast link establishment procedure, comprising:
transmitting to a UE-to-UE Relay a first PC5-S message for establishing a PC5 unicast link with the UE-to-UE Relay, wherein the first PC5-S message is addressed to a default Destination Layer-2 Identity (ID) configured by a network and includes a Layer-2 ID of a second UE different than the UE-to-UE Relay, and wherein the Layer-2 ID is self-assigned by the second UE; and
receiving a second PC5-S message from the UE-to-UE Relay, wherein the second PC5-S message is transmitted by the UE-to-UE Relay in response to reception of the first PC5-S message.

2. The method of claim 1, wherein the default Destination Layer-2 ID is associated with a UE-to-UE Relay service.

3. The method of claim 1, wherein the first PC5-S message includes the first UE's Application Layer ID.

4. The method of claim 1, wherein the first PC5-S message includes the second UE's Application Layer ID.

5. The method of claim 1, wherein the first PC5-S message includes Service Info of a Proximity-based Services (ProSe) service.

6. The method of claim 5, wherein the Service Info of the ProSe service is an identity of the ProSe service.

7. The method of claim 1, wherein the first PC5-S message is a Direct Communication Request message or a DIRECT LINK ESTABLISHMENT REQUEST message.

8. The method of claim 1, wherein the second PC5-S message is a Direct Communication Accept message or a DIRECT LINK ESTABLISHMENT ACCEPT message.

9. A first User Equipment (UE), comprising:
a processor; and
a memory operatively coupled to the processor, wherein the processor is configured to execute a program code to:
transmit to a UE-to-UE Relay a first PC5-S message for establishing a PC5 unicast link with the UE-to-UE Relay, wherein the first PC5-S message is addressed to a default Destination Layer-2 Identity (ID) configured by a network and includes a Layer-2 of a second UE different than the UE-to-UE Relay, and wherein the Layer-2 ID is self-assigned by the second UE; and
receive a second PC5-S message from the UE-to-UE Relay, wherein the second PC5-S message is transmitted by the UE-to-UE Relay in response to reception of the first PC5-S message.

10. The first UE of claim 9, wherein the default Destination Layer-2 ID is associated with a UE-to-UE Relay service.

11. The first UE of claim 9, wherein the first PC5-S message includes the first UE's Application Layer ID.

12. The first UE of claim 9, wherein the first PC5-S message includes the second UE's Application Layer ID.

13. The first UE of claim 9, wherein the first PC5-S message includes Service Info of a Proximity-based Services (ProSe) service.

14. The first UE of claim 13, wherein the Service Info of the ProSe service is an identity of the ProSe service.

15. The first UE of claim 9, wherein the first PC5-S message is a Direct Communication Request message or a DIRECT LINK ESTABLISHMENT REQUEST message.

16. The first UE of claim 9, wherein the second PC5-S message is a Direct Communication Accept message or a DIRECT LINK ESTABLISHMENT ACCEPT message.

17. The method of claim 1, wherein the first UE is a Source UE.

18. The method of claim 1, wherein the second UE is a Target UE.

19. The first UE of claim 9, wherein the first UE is a Source UE.

20. The first UE of claim 9, wherein the second UE is a Target UE.

* * * * *